United States Patent
Wang et al.

(10) Patent No.: US 10,831,573 B2
(45) Date of Patent: Nov. 10, 2020

(54) MESSAGE PROCESSING

(71) Applicant: INTERNATIONAL BUSINESS MACHINES CORPORATION, Armonk, NY (US)

(72) Inventors: Cheng Fang Wang, Beijing (CN); Xi Bo Zhu, Beijing (CN); Wu Song Fang, Beijing (CN); Ping Xiao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/188,600

(22) Filed: Nov. 13, 2018

(65) Prior Publication Data

US 2020/0151036 A1    May 14, 2020

(51) Int. Cl.
| | | |
|---|---|---|
| G06F 9/44 | (2018.01) | |
| G06F 9/46 | (2006.01) | |
| G06F 3/00 | (2006.01) | |
| G06F 13/00 | (2006.01) | |
| G06F 9/54 | (2006.01) | |
| G06F 16/11 | (2019.01) | |

(52) U.S. Cl.
CPC .......... *G06F 9/546* (2013.01); *G06F 16/122* (2019.01)

(58) Field of Classification Search
CPC ..................................................... G06F 9/546
USPC ........................................................ 719/313
See application file for complete search history.

(56) References Cited

U.S. PATENT DOCUMENTS

| | | | |
|---|---|---|---|
| 8,024,276 B2 | 9/2011 | Drane et al. | |
| 8,407,750 B2 | 3/2013 | Vorbau | |
| 2016/0099987 A1 | 4/2016 | Shamma | |
| 2016/0249090 A1* | 8/2016 | Wong | H04N 21/235 |

FOREIGN PATENT DOCUMENTS

| | | |
|---|---|---|
| CN | 104065998 A | 9/2014 |
| CN | 105376591 A | 3/2016 |

OTHER PUBLICATIONS

Disclosed Anonymously, "Method and Apparatus to Facilitate Extraction and Collaboration of Flash Content", IP.com Prior Art, Feb. 14, 2011, 2 pages.
Mell et al., "The NIST Definition of Cloud Computing", National Institute of Standards and Technology, Special Publication 800-145, Sep. 2011, pp. 1-7.

* cited by examiner

*Primary Examiner* — Timothy A Mudrick
(74) *Attorney, Agent, or Firm* — Teddi Maranzano

(57) ABSTRACT

Embodiments of the present disclosure relate to methods, systems, and computer program products for processing a message including a content and operations performed on the content. According to the method, in response to a message including both a content and a description of operations performed on the content being requested to access, an application may be made to access the content; and the application may be made to execute the operations performed on the content.

20 Claims, 5 Drawing Sheets

MESSAGE PROCESSING

BACKGROUND

The present disclosure relates to the field of information sharing, and more specifically, to methods, systems and computer program products for processing a message including both a content and a description of operations performed on the content.

Social networking is increasingly becoming a necessary part of daily life. A person can easily share an experience, such as photos, videos, and text messages, using any number of social networking apps. Sometimes a person may find a humorous portion of a long video that another person, for example a friend, would also find humorous. However, in current technology, sharing a live streaming video, including actions (e.g., forward, backward, pause), is not provided.

SUMMARY

Example embodiments of the present disclosure disclose methods, systems, and computer program products for processing a message including both a content and a description of operations performed on the content.

In an aspect, a method is disclosed. According to the method, in response to a request to access a message including both a content and a description of operations performed on the content, an application may be made to access the content; and the application may be made to execute the operations performed on the content. Embodiments of the present disclosure enable a user to stream (i.e., push) video streaming live to another person who is the receiver, together with the actions performed by the user on the video. While the receiver is watching the video in real-time with the user, the receiver can also perform actions (e.g., forward, backward, pause) on the video. The receiver's actions are pushed back to the user.

In an embodiment, where the video is on a web server, the method transfers metadata to the receiver, and begins streaming the video.

In an embodiment, where the video is on the user's local device, the method captures the user's screen and actions and sends them to the receiver.

In another aspect, a computer-implemented system is disclosed. The system may include a computer processor coupled to a computer-readable memory unit, said memory unit comprising instructions that when executed by the computer processor implements the above method.

In yet another aspect, a computer program product is disclosed. The computer program product comprises a computer readable storage medium having program instructions embodied therewith. When executed on one or more processors, the instructions may cause the one or more processors to perform the above method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Figure 1:
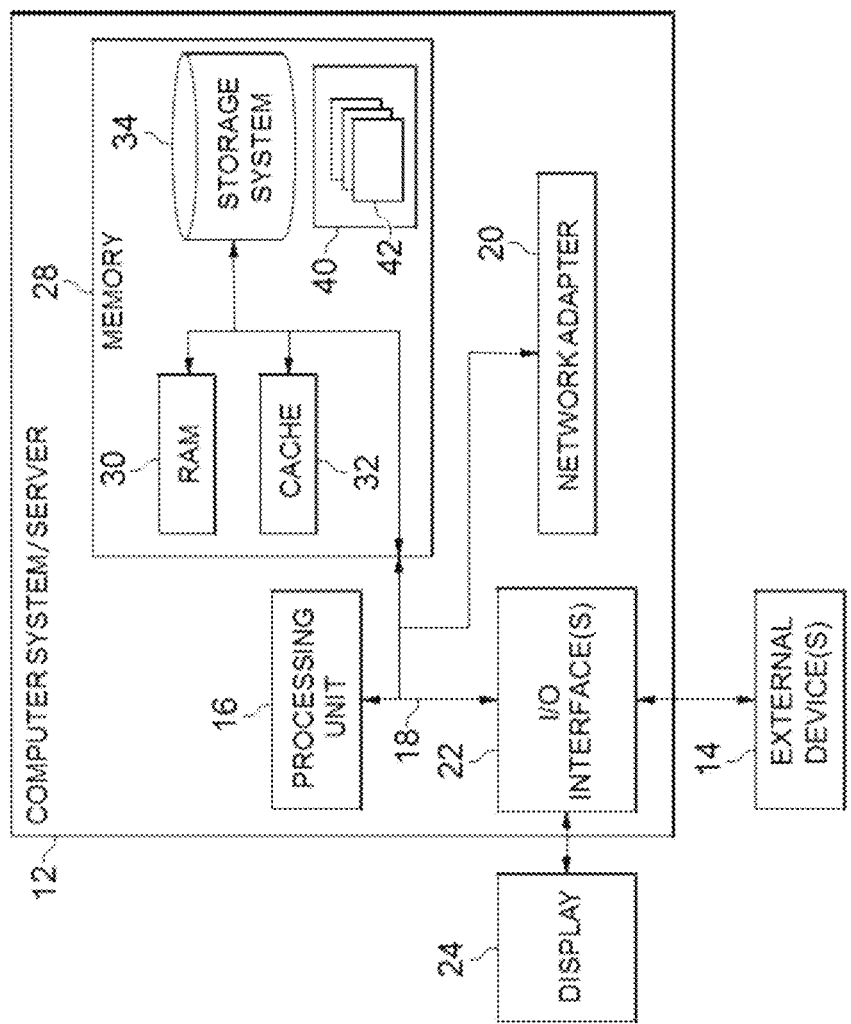
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
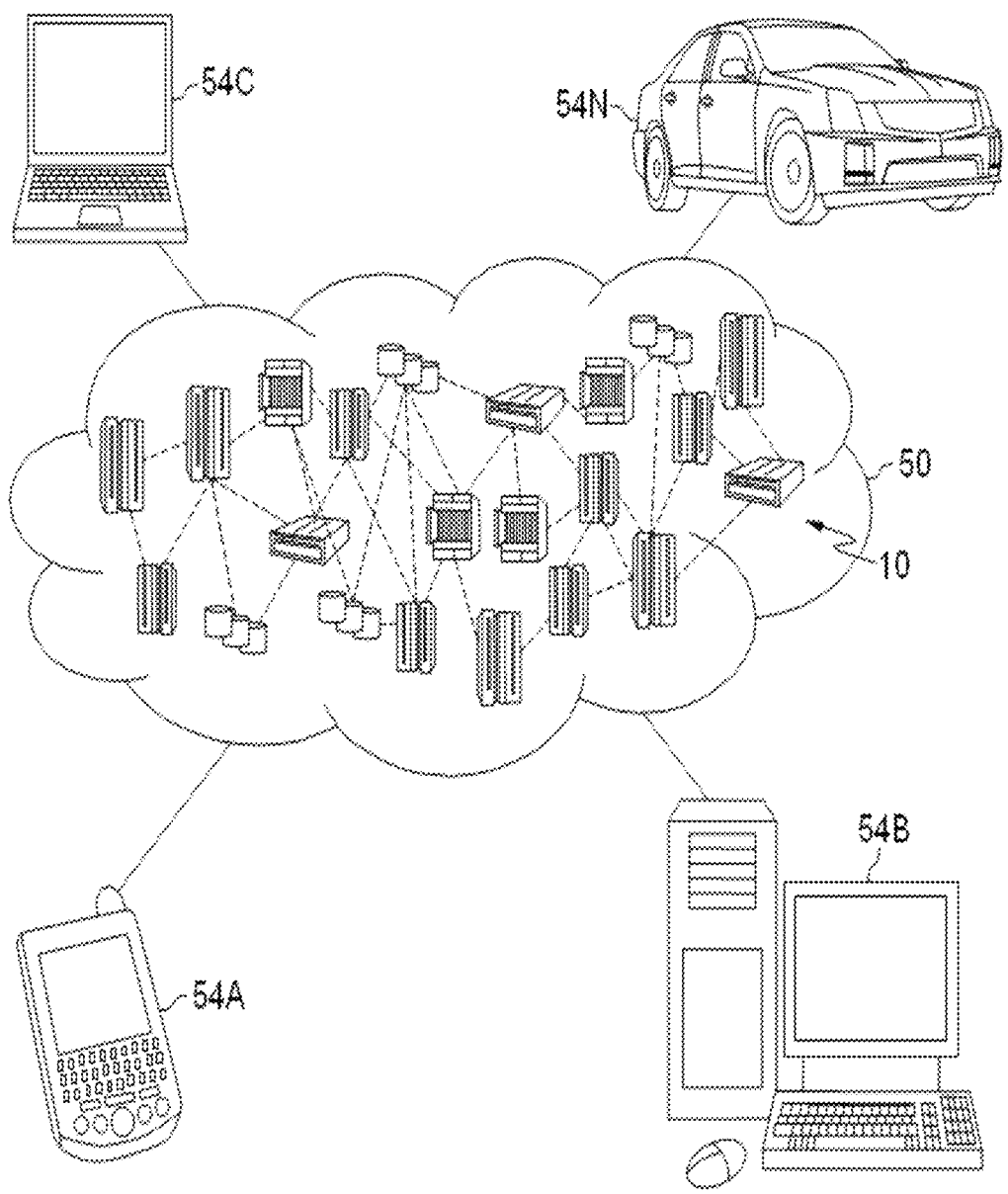
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
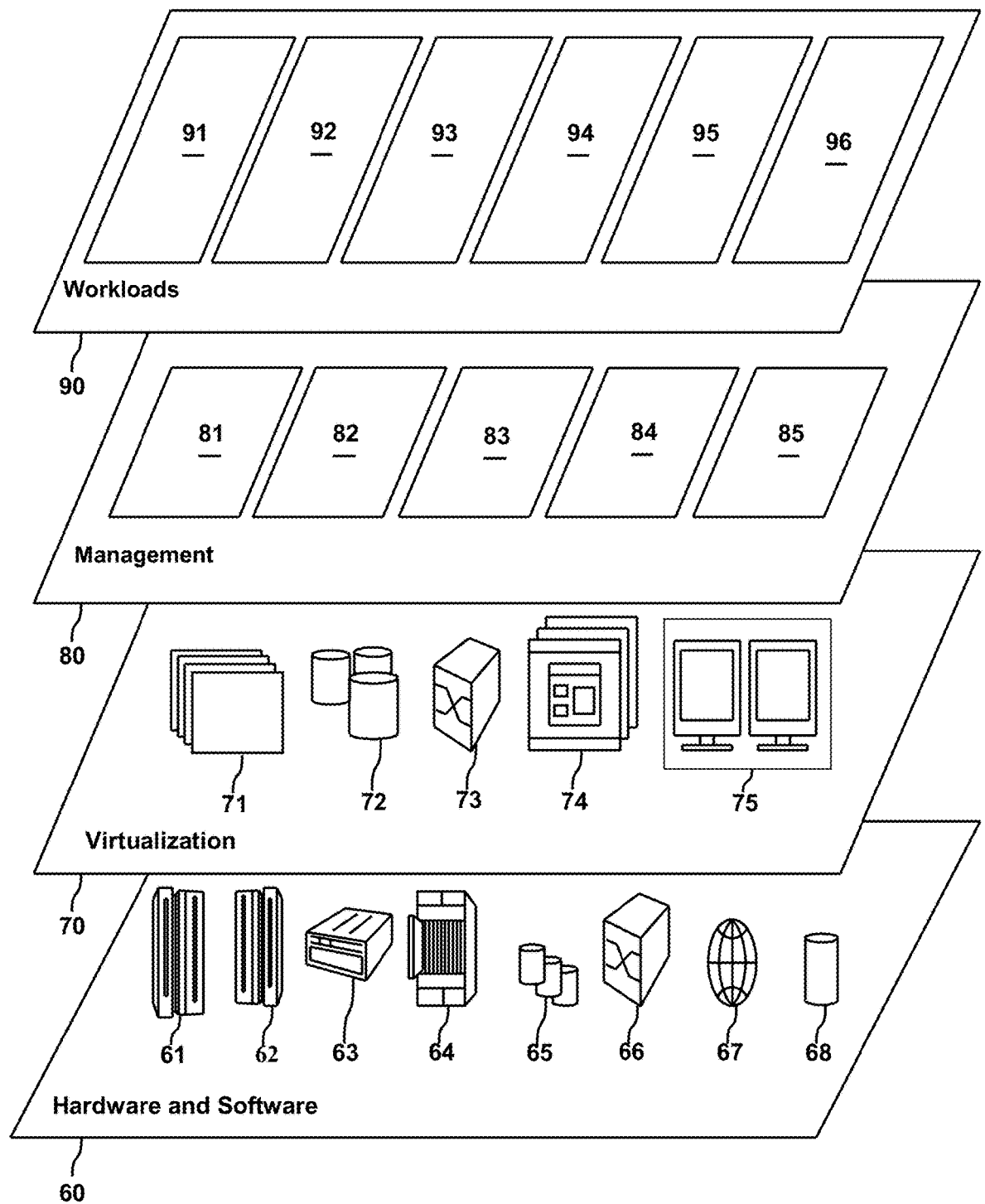
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message processing 96.

Currently a user can share multiple types of information with others. For example, the user can share a piece of text, a file the user has viewed, or a link to a file, such as a video file, etc. in a message. The user can send the message to others by posting the message in an application, such as an instant messaging application. When the user shares a content, such as a file or a link to a file, the user can just send the content in the message, while the user can not share the user's operations to the content in the same message. For example, the user wants to send a portion of a long video to a friend. While the user accesses the video, the user makes an action of "fast forwarding" to the beginning of the segment. After the segment has been played, the user makes an action of "rewind" to the beginning of the segment. Then the user makes an action of "slow playing" from the beginning of the segment. If the user's friend follows the operations of the user when playing the video, the friend can know why the user feels the video is funny. If the friend just glances at the video, but does not watch the whole video, the friend may not notice the segment. So the friend cannot catch the user's humor, and the purpose of the user to share the video cannot be achieved.

Thus there is a need for the user to share the content together with a description of the user's operations performed on the content to provide better user experience.

Figure 4:
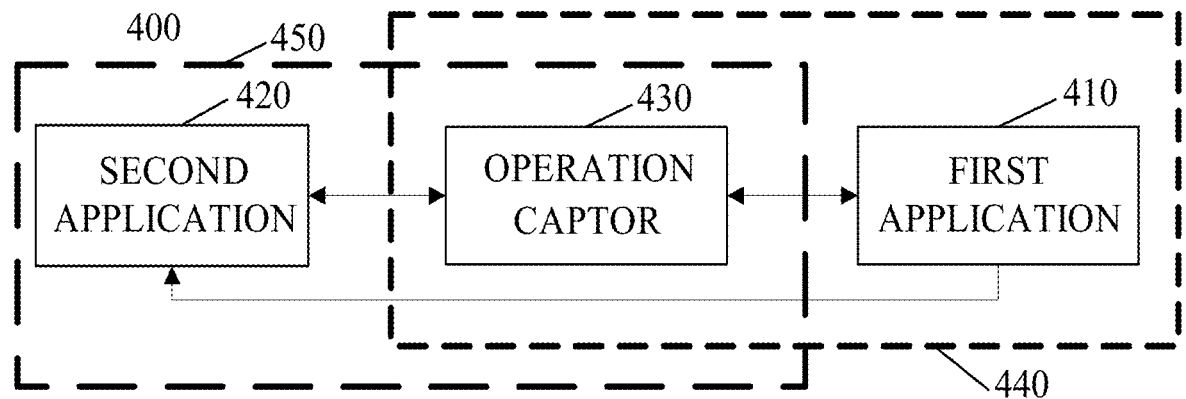
FIG. 4 depicts a block diagram illustrating a system structure for processing a message including both a content and a description of operations performed on the content according to an embodiment of the present invention.

FIG. 4 depicts a block diagram illustrating a system structure 400 for processing a message including both a content and a description of operations performed on the content according to an embodiment of the present invention. Referring to FIG. 4, the system 400 comprises three components: a first application 410 for processing the message including the content and the description of the operations performed on the content, a second application 420 for processing the content, and an operation captor 430 for capturing the operations performed on the content by the second application 420 and communicating with the first application 410. The first application 410 can be, for example, an online video application, an instant messaging application, and similar applications. The second application 420 can be any application configured to process the content, for example, a video player, a text editor, a pdf editor, and the like. The content can be any types of file, such as text, drawings, audios, videos, etc.

In some embodiments, the operation captor 430 can be a stand-alone application. The operation captor 430 can capture all the user's operations for different contents in different second applications 420 continuously or per request from the user/the first applications 410. The operations can be captured through interfaces between the second applications 420 and the operation captor 430. Then a description of the captured operations can be sent to the first applications 410 through interfaces between the first applications 410 and the operation captor 430, if the first applications 410 requests the description of the captured operations.

In some embodiments, the operation captor 430 can be integrated into the first application 410, as indicated by a dotted box 440. Therefore the first application 410 can not only process messages but also catch the operations performed on the different contents by users in the different second applications 420 per request from the users through interfaces between the first application 410 and the second applications 420.

In some embodiments, the operation captor 430 can be integrated into the second application 420, as indicated by a dotted box 450. Thus the operations performed on the content by the user in the second application 420 can be captured per request from the user and sent to the first application 410 per request from the user/the first application 410 through an interface between the first application 410 and the second application 420.

In some embodiments, the operation captor 430 can be a stand-alone application, but the first application 410 and the second application 420 can be the same application.

In some embodiments, the operation captor 430, the first application 410 and the second application 420 can be integrated into one application 400.

Figure 5:
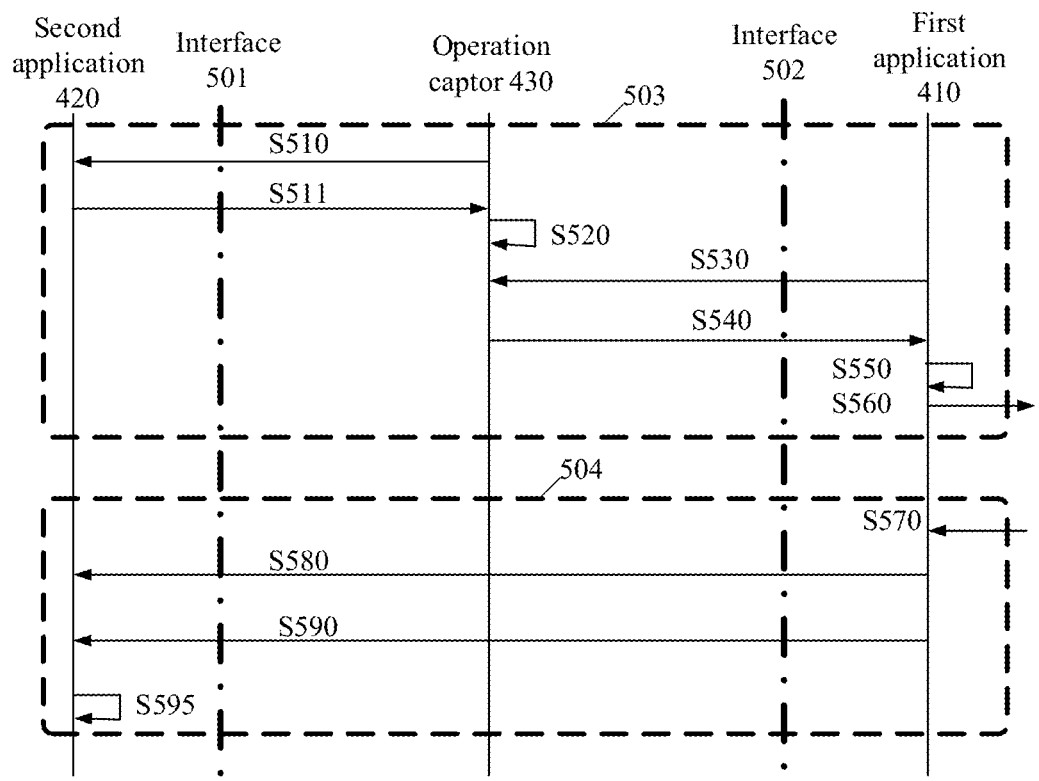
FIG. 5 depicts a flow diagram illustrating a method for processing a message including both a content and a description of operations performed on the content according to an embodiment of the present invention.

FIG. 5 depicts a flow diagram illustrating a method 500 for processing a message including a content and a description of operations performed on the content according to an embodiment of the present invention, in which the operation captor 430 is a stand-alone application. The message can be sent out or received by the first application 410. For the sake of clarity, a first message sent may include a first content and a description of operations performed on the first content, while a second message received may include a second content and a description of operations performed on the second content.

Referring to FIG. 5, the process can begin at step S510 in which the operation captor 430 may request the description of the operations performed on the first content by a user from the second application 420 which is processing the first content such as playing a video. The step S510 is optional if the first application 410 and the second application 420 are the same application.

The method 500 then can proceed to step S511 in which the operation captor 430 can obtain the description of the operations performed on the first content from the second application 420 through an interface between the second application 420 and the operation captor 430 continuously or per request from the user. The interface between the second application 420 and the operation captor 430, and the formats of the description of operations performed on the first content by the user can be defined by the second application 420. The formats of a description of operations can be, for example, a text file, an XML file, a data structure, etc. In other embodiments, the operation captor 430 can obtain the operations performed on the first content from the operation system directly.

The method 500 can proceed to optional step S520 in which the operation captor 430 can store the description of the operations performed on the first content if necessary. For example, if the operation captor 430 captures the description of all operations performed on different contents by the user in different second applications 420 continuously, the description of the operations on different contents need to be stored. If the operation captor 430 captures the description of operations on a content performed by the user in a second application 420 per request from the first application 410, the description of the captured operations can be sent to the first application 410 directly instead of storing the description of the captured operations. The description of the operations performed on the different first contents can be stored into files or a database so that the operations can be searched easily, such as operations performed on File 1 on 2018 Jan. 1, operations performed on File 1 at 2018 Jan. 2, operations performed on File 2 on 2018 Jan. 1, etc. It can be understood that different operations may be performed on the same content at different times. Just the latest description of operations performed on the content can be stored, or descriptions of different operations performed on the content at different times can be stored.

At optional step S530, the first application 410, which is, for example, accessing the first message including both the first content and the description of operations performed on the first content, may request the description of the operations performed on the first content from the operation captor 430. At step S540, the first application 410 may receive the description of the operations performed on the first content from the operation captor 430. The step S530 is optional because if the first application 410 and the second application 420 are the same application, there is no need to implement the step.

At step S550, the first application 410 may combine the first content and the description of the operations performed on the first content into the first message, and then at optional step S560 the first application 410 may send out the first message. The process of sending the first message, indicated by a dotted box 503 as part of method 500, is ended.

With continued reference to FIG. 5, the method 500 then can proceed to step S570 in which the first application 410 may receive the second message including the second content and the description of operations performed on the second content. The user of the first application 410 may request to access the second message. At step 580, the first application 410 may allow the second application 420 to access the second content. Subsequently, at step S590 the first application 410 may make the second application 420 execute the operations performed on the second content. In some embodiments, the first application 410 and the second application 420 are different applications. Then the first application 410 may send the description of the operations performed on the second content to the second application 420, and the second application 420 may execute the operations performed on the second content at step S595. The process of receiving the second message, indicated by a dotted box 504 as part of method 500, is ended.

In some embodiments, the first application 410 and the second application 420 could be the same application, steps S590 and S595 can be combined into one step.

In some embodiments, the operation captor 430 may be integrated into the first application 410, the process of the method 500 can be checked from an interface indicated by a dotted line 501. For a process of the first message including both the first content and the description of operations performed on the first content being created indicated by a dotted box 503, the first application 410 may request the description of the operations performed on the first content from the second application 420 at step S510. Then the first application 410 may obtain the description of the operations performed on the first content from the second application 420 at step S511. At last the first application 410 may combine the first content and the description of the operations performed on the first content into the first message at step S550 and send out the first message at step S560. For a process of the second message including both the second content and the description of operations performed on the second content being received indicated by a dotted box 504, the first application 410 may make the second application 420 access the second content at step S580, and then the first application 410 may make the second application 420 execute the operations performed on the second content at step S590. Finally the second application 420 may execute the operations performed on the second content at step S595.

In some embodiments of the operation captor 430 being integrated into the second application 420, the process of the method 500 can be checked from an interface indicated by a dotted line 502. For a process of the first message including both the first content and the description of operations performed on the first content being created indicated by a dotted box 503, the first application 410 may request the description of the operations performed on the first content from the second application 420 at step S530. Then the first application 410 may obtain the description of the operations performed on the first content from the second application 420 at step S540. At last the first application 410 may combine the first content and the description of the operations performed on the first content into the first message at step S550 and send out the first message at step S560. For a process of the second message including both the second content and the description of operations performed on the second content being received indicated by a dotted box 504, the first application 410 may make the second application 420 access the second content at step S580. Then the first application 410 may then make the second application 420 execute the operations performed on the second content at step S590. Finally the second application 420 may execute the operations performed on the second content at step S595. In this method, it is assumed that the second application 420 is configured to process the second content.

In some embodiments, the description of an operation performed on a content may comprise an action made on the content and a portion of the content related to the action. In other words, the description of the operation performed on the content can be expressed as "an action, a portion of a content related to the action". For example, a user A would share the video named Video1 and the user A's operations on the video in an on-line video application named Multi-view (the first application). In this example, the user A begins to watch the video Video1 in another on-line video application named Sharer (the second application). The user A first goes directly to the $10^{th}$ minute of the video and plays with normal speed for 2 minutes, then fast forwards to the $36^{th}$ minute of the video, then plays the video until the 60th minute of the video with double speed, at last quits the second application 420. Each description of above operations can be expressed as "an action, a portion of the video (e.g. a time period of the video expressed as "from start time to end time")". Here the time period of the video indicates a portion of the video related to the action, e.g. on which the action is made. Thus the following Table 1 are the description of operations stored in a file in the application Sharer:

TABLE 1

Content: Video1.MP3 //content name and type

| | Actions | Portions of the content |
|---|---|---|
| 1 | Going | from beginning to $10^{th}$ minute |
| 2 | Playing with normal speed | from $10^{th}$ minute to $12^{th}$ minute |
| 3 | Fast forwarding | from $12^{th}$ minute to $36^{th}$ minute |
| 4 | Playing with double speed | from $36^{th}$ minute to $60^{th}$ minute |

It can be understood that if a content is a video or an audio file, a portion of content related to an action can be expressed as a time period of the video.

The description of the operations the user performs on the video may be requested to send from the application Sharer to the application Multi-View. After receiving the description of the operations from the application Sharer, the application Multi-view then may combine a link indicating the file Video1 in the application Sharer and the description of the above operations such as an operation file together into a message, and may post the message into a sharing area of the application Multi-View. Once a user B finds the message in the sharing area of the application Multi-View, the user B may access the message. In order to do this, the application Multi-View may first access the link and open the file of Video1 in the application Multi-View, then execute the operations on the respective portion of the video in the application Multi-View, such as open the video file. After that, Multi-View goes to the 10th minute of the video to play for 2 minutes, then fast forwards to the $36^{th}$ of the video, and then uses the double speed to play to the $60^{th}$ minute of the video, at last quits the playing.

It can be found that the first application and the second application can be same or different applications during creating the message, while the first application and the second application can be same or different applications during accessing the message. In this example, the names Video1, Multi-View and Sharer are virtual name and are not real entities, and also it is assumed that both Multi-View and Sharer have obtained the license from the entity that the video Video1 belongs to.

For an audio or a video file, the description of an operation comprising "an action, a portion of the content" is enough for the second application to execute. In some embodiments, the description of the operation may further comprise time related to an action, e.g. the description of the operation comprises "an action, a portion of the content, and time". For example, the content is a text file named test.txt, the user opens the file using an application Text Editor at beginning, and then turns to page 5 at 5th second from the beginning, and then highlights text on lines 5-10 on page 5 at $10^{th}$ second from the beginning. After that, the user writes comments "It is really good" for characters 15-35 at line 25 on page 5 at $20^{th}$ second from the beginning, then quits the application Text Editor. Thus the following table 2 are the description of operations stored in a file:

TABLE 2

Content: test.txt //content name and type

| Actions | portions of the content | time |
|---|---|---|
| 1 turning to page | page 5 | $5^{th}$ second |
| 2 highlighting text | lines 5-10 on page 5 | $10^{th}$ second |
| 3 writing comments "It is really good " | characters 15-35 at line 25 on page 5 | $20^{th}$ second |

Once a user C finds a message comprising both test.txt file and the description of the above operations, the user C may access the message. In order to do this, the application configured to process a txt file, such as the application Notebook, can open the file test.txt, then turn to page 5 at $5^{th}$ second from the beginning, and then highlight text on lines 5-10 on page 5 at 10th second from the beginning. After that the application may write comments "It is really good" for characters 15-35 at line 25 on page 5 at $20^{th}$ second from the beginning, then may quit from the application.

In some embodiments, if a time interval between any two operations is long, the application, for example Notebook, can automatically reduce the time interval.

In some embodiments, if there is no time stored for each operation in the operation file, the application, for example Notebook, can execute each operation in a fixed time interval, such as execute an operation every 20 seconds.

Figure 6:
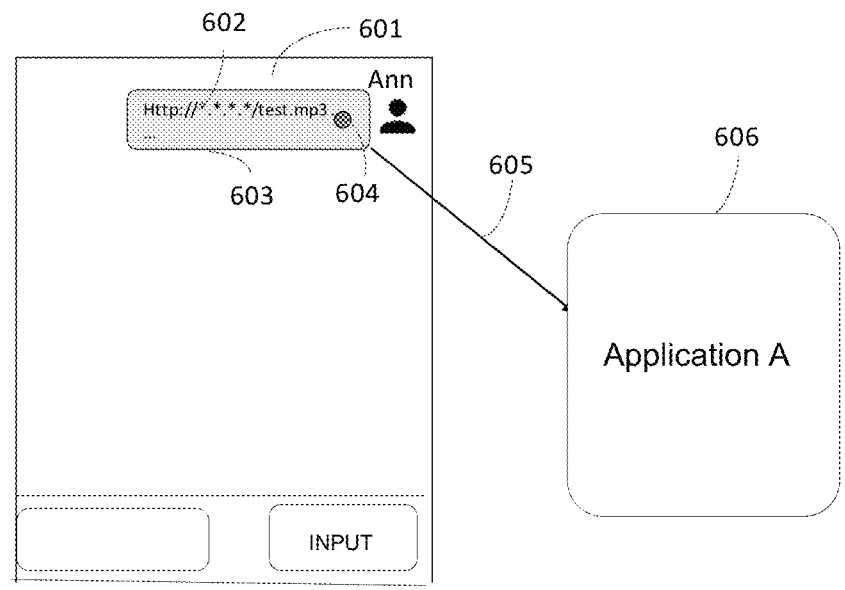
FIG. 6 shows creating a message using an interface of the instant messaging application.

In some embodiments, User1 has watched a funny video named test.mpeg4. User1 wants to share the video and a description of her operations on the video with her friend User2 though a message in an instant messaging application, Instant1. FIG. 6 shows an interface 601 of the Instant1 in which User1 is creating the message according to an embodiment of the present invention. At first, User1 may input a link 602 linked to the video file to a new message in Instant1 (the first application). Instant1 may find that the input new message includes a file link 602, so Instant1 may ask User1 whether she would share the description of her operations on the video (which is not shown in the interface 601). If User1's answer is "Yes" (which is not shown in the interface 601), then Instant1 may make an application A 606 configured to process a video file on User1's device to open the video file via the link 602, as indicated by an arrow 605 in FIG. 6. Here, suppose that the operation captor 403 has been integrated into Instant1 (the first application 401) in this example. Instant1 may obtain the description of User1's operations on the video file from the application A 606 and then may combine the original link 602 and the description of User1's operations into the message 603 in the interface 601, in which an indication 604 may indicate that the message 603 include the description of the operations performed on the linked file 602. Then the message 602 can be sent to Jim by XYZ from Ann's device.

Figure 7:
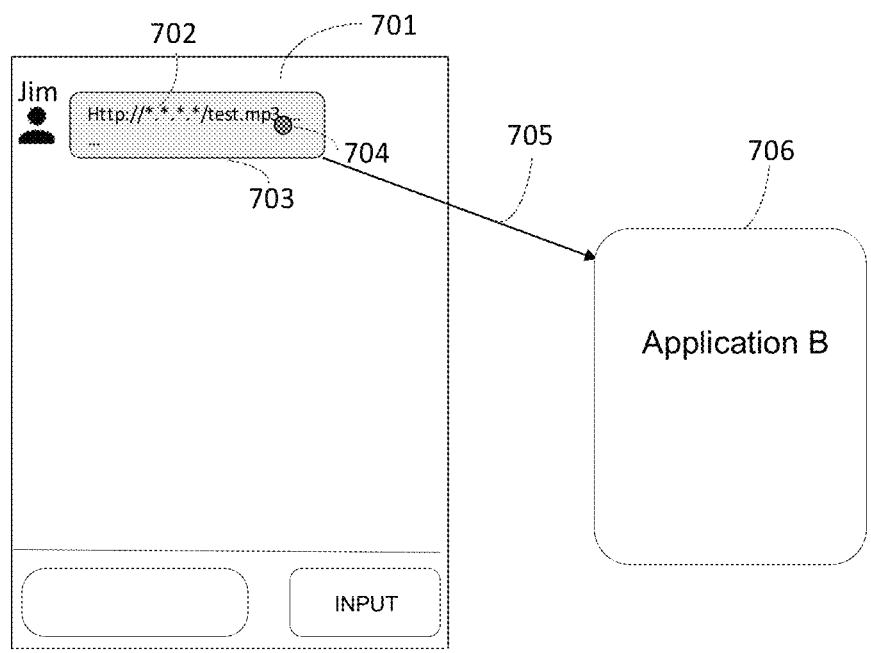
FIG. 7 shows a user receiving a message using an interface of the instant messaging application.

FIG. 7 shows an interface 701 of the instant messaging application XYZ in which Jim is receiving a message 703 from Ann according to an embodiment of the present invention. First Jim may receive the message 703 in which a link 702 linked to the video file and an indication 704 indicating a description of operations performed on the video file are included. XYZ may find the message includes the file link 702 and the description of operations performed on the file 704, so XYZ may remind Jim whether he would access the description of the operations on the video (which is not shown in the interface 701). If User2's answer is "Yes" (which is not shown in the interface 701), then Instant1 may make an application B configured to process a video file on User2's device open the video file via the link 702, as indicated by an arrow 705 in FIG. 7. Here suppose that the operation captor 403 has been integrated into Instant1 in this example, and then Instant1 may send the description of User1's operations on the video file to the application B 706. Then the application B 706 may execute the operations on the video file.

In some embodiments, if the content is a video file or an audio file, or a link linked to a video file or an audio file, an action made by a user in an operation may be one of the following: rewinding, forwarding, frame freezing/still, skipping forward, skipping back, super high speed rewinding and fast forwarding, super high speed skipping forward and back, variable slow motion speeds, variable fast motions speeds and the like.

It should be noted that the processing for a message including both a content and a description of operations performed on the content according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   in response to a request to access a message, asynchronously received from a sender of the message, wherein the message includes both a content and operations performed on the content, wherein the content is a type of file including a text file, a video, an audio, a drawing, or a portable document format (PDF), and wherein the operations performed on the content are included in the content or in a file separate from the content,
   making, by one or more processors, an application access the content; and
   making, by one or more processors, the application execute the operations performed on the content.

2. The method of claim 1, further comprising:
   in response to a request to create the message,
   obtaining, by one or more processors, the description of the operations performed on the content; and
   combining, by one or more processors, the content and the description of the operations performed on the content into the message.

3. The method of claim 2, wherein the description of the operations performed on the content is obtained from another application, which performs the following steps:
   receiving, by one or more processors, the description of the operations performed on the content;
   storing, by one or more processors, the description of the operations performed on the content; and
   in response to receiving a request to obtain the description of the operations performed on the content, sending, by one or more processors, the description of the operations performed on the content.

4. The method of claim 2, wherein the description of an operation performed on the content comprises an action made on the content and a portion of the content related to the action.

5. The method of claim 4, wherein the description of an operation performed on the content further comprises time related to the action.

6. The method of claim 4, wherein the content is a file or a web link linked to a file.

7. The method of claim 6, wherein the file is from an application including: an audio application, instant messaging application, text file application, drawing application, or a video application.

8. The method of claim 7, wherein the action comprises one or more of the following, alone or in combination: rewinding, forwarding, paging forward and paging backward, frame freezing/still, skipping forward, skipping back, super high speed rewinding and fast forwarding, super high speed skipping forward and back, variable slow motion speeds, variable fast motions speeds.

9. A computer system comprising one or more computer processors coupled to a computer-readable memory unit, said memory unit comprising instructions that when executed by the one or more computer processors implement a method comprising:

in response to a request to access a message, asynchronously received from a sender of the message, wherein the message including both a content and operations performed on the content, wherein the content is a type of file including a text file, a video, an audio, a drawing, or a portable document format (PDF), and wherein the operations performed on the content are included in the content or in a file separate from the content, making, by one or more processors, an application access the content; and making, by one or more processors, the application execute the operations performed on the content.

10. The computer system of claim 9, the method further comprising:

in response to a request to create the message,
obtaining, by one or more processors, the description of the operations performed on the content; and combining, by one or more processors, the content obtained and the description of the operations performed on the content into the message.

11. The computer system of claim 10, wherein the description the operations performed on the content is obtained from another application, which performs the following steps:

receiving, by one or more processors, the description of the operations performed on the content;

storing, by one or more processors, the description of the operations performed on the content; and in response to receiving a request to obtain the description of the operations performed on the content, sending, by one or more processors, the description of the operations performed on the content.

12. The computer system of claim 10, the description of an operation performed on the content comprises an action made on the content and a portion of the content related to the action.

13. The computer system of claim 12, wherein the description of an operation performed on the content further comprises time related to the action.

14. The computer system of claim 10, wherein the content is a file or a web link linked to a file, and the content is included in a type of file including a text file, a video, an audio, a drawing, or a portable document format (PDF).

15. A computer program product, the computer program product comprising a computer readable storage medium having program instructions embodied therewith, the program instructions executable by one or more processors to cause the one or more processors to implements a method comprising:

in response to a request to access a message, asynchronously received from a sender of the message, wherein the message includes both a content and operations performed on the content, wherein the content is a type of file including a text file, a video, an audio, a drawing, or a portable document format (PDF), and wherein the operations performed on the content are included in the content or in a file separate from the content, making, by one or more processors, an application access the content; and making, by one or more processors, the application execute the operations performed on the content.

16. The computer program product of claim 15, the method further comprising:

in response to a request to create the message,
obtaining, by one or more processors, the description of the operations performed on the content; and combining, by one or more processors, the content obtained and the description of the operations performed on the content into the message.

17. The computer program product of claim 16, wherein the description the operations performed on the content is obtained from another application, which performs the following steps:

receiving, by one or more processors, the description of the operations performed on the content;

storing, by one or more processors, the description of the operations performed on the content; and in response to receiving a request to obtain the description of the operations performed on the content, sending, by one or more processors, the description of the operations performed on the content.

18. The computer program product of claim 16, the description of an operation performed on the content comprises an action made on the content and a portion of the content related to the action.

19. The computer program product of claim 18, wherein the description of an operations performed on the content further comprises time related to the action.

20. The computer program product of claim 18, wherein the content is a file or a web link linked to a file, and wherein the content is included in a type of file including a text file, a video, an audio, a drawing, or a portable document format (PDF).

* * * * *